Dec. 17, 1940.   B. A. JACOBS   2,225,273
ROTATING ADJUSTABLE TILTING TABLE CHUCK
Filed Jan. 13, 1939   2 Sheets-Sheet 1

INVENTOR.
BRUNO A. JACOBS

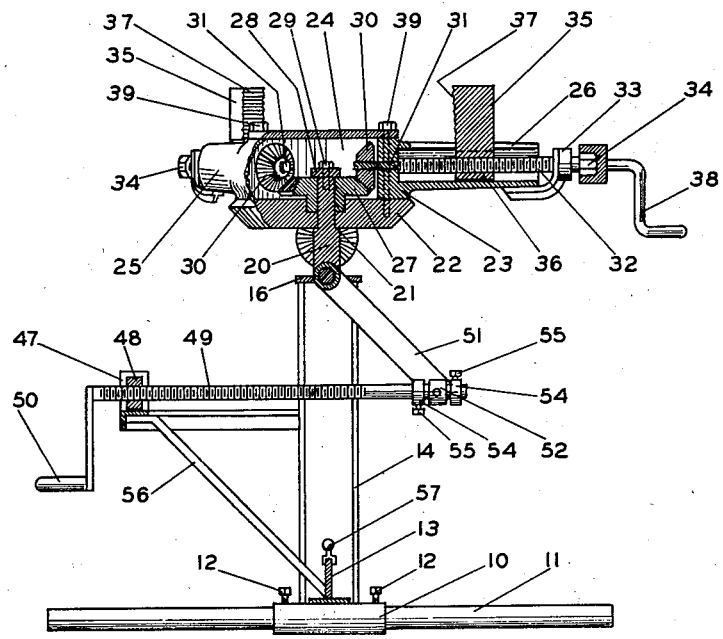

Patented Dec. 17, 1940

2,225,273

UNITED STATES PATENT OFFICE 2,225,273

ROTATING ADJUSTABLE TILTING TABLE CHUCK

Bruno A. Jacobs, Phillips, Tex., assignor to Phillips Petroleum Company, a corporation of Delaware Application January 13, 1939, Serial No. 250,811

5 Claims. (Cl. 29—89)

This invention relates to adjustable tilting table chucks which can be readily rotated to support and maintain a piece of work in any desired position. Among its many specific applications, my invention is highly suitable for holding various sizes and types of metallic tubing at the proper angle during welding or cutting operations.

Heretofore, in arc welding two sections of metallic tubing in the field, it has been customary to employ dolly rollers and wood blocks to support the tubing. This method has not been satisfactory from the view-points of efficiency and quality of weld obtained. Considerable time is consumed in positioning the tubing preliminary to the actual welding. After a portion of the welded joint is completed, it is generally necessary to wait until the metal has cooled sufficiently to permit of its being repositioned before continuing with the welding. This long drawn out procedure not only results in loss of time, but, in addition, does not produce a good welded joint. The practice of my present invention obviates the disadvantages experienced in the past. A piece of work can be readily and quickly placed on my device and securely mounted thereon. The device is then tilted and rotated until the work is in the most desirable position for welding. The device may also be adjusted so as to maintain the work at the proper angle to develop a good puddle. By maintaining the puddle on top of the work, the correct amount of metal may be deposited on the joint. Furthermore, by operating my device to rotate the work at constant speed during the welding, a strong, uniform and penetrating weld is assured. Welds produced by using my adjustable tilting chuck are superior in all respects to those obtained by employing other types of holding and supporting means. The joints possess tremendous strength and present a smooth neat appearance, free from undesirable puddle marks. The amount of time required to prepare the work for welding and the time necessary to produce a complete weld are reduced to a minimum. The device is adaptable to hold and support tubing of a variety of different sizes and shapes. It is constructed of light, rigid, and durable parts and can be quickly moved from one locality to another, as the need for its use arises.

The primary object of this invention is to provide a table chuck which may be readily, easily and quickly adjusted so as to hold, tilt and rotate a piece of work to any desired position.

Another object of my invention is to provide a rotating adjustable tilting table chuck which is light in weight, rugged in construction, and inexpensive to manufacture and maintain.

A further object of this invention is to provide a rotating adjustable tilting table chuck which is adaptable to securely hold a wide range of sizes and types of materials at the proper angle for carrying out various operations, such as welding, cutting or beveling.

These and additional objects and advantages will be readily apparent from the following description and annexed drawings which illustrate a preferred embodiment of the invention.

In the drawings:

Figure 2 is a plan view of the device illustrated in Figure 1.

Figure 3 is a vertical view partly in cross section, taken along line 3—3' in Figure 2.

Figure 1:
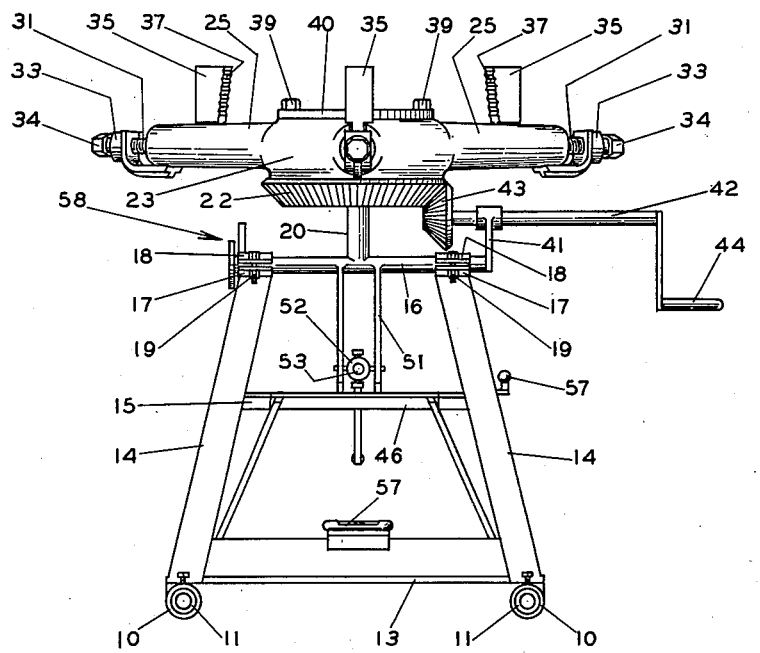
Figure 1 is a front elevation view of my invention.

Referring to the drawings, there is denoted therein a stand consisting of a base and an upright frame. The base is constructed of metallic sleeves 10 which encircle and retain pipe feet 11 in place by means of set screws 12. A spreader 13 welded to the sleeves completes the base structure. The upright frame is composed of legs 14 which are welded to the foot sleeves. Intermediate the ends of these legs is a combined horizontal spreader and brace 15. A tubular horizontal cross member 16 is pivotally mounted in split yokes on the upper extremity of legs 14. Each yoke consists of a seat element 17 and a clamp or top element 18 which are fastened together by bolts 19.

Midway between the yokes and rigidly connected to tubular member 16 is a cylindrical spindle 20 having a shoulder 21 which serves as a bearing surface for bevel gear 22. Directly above bevel gear 22 is a chuck table or spider 23 having a central opening 24 and three slideways or tubular arms 25. Each spider arm is provided with a slot 26.

Also concentric with spindle 20 and free to rotate with respect thereto is a second bevel gear 27 which is retained on the spindle through the coaction of collar 28 and stud bolt 29. Three bevel pinions 30 in the central opening of the spider are disposed at right angles to and are in engagement with bevel gear 27. These pinions may be individually actuated by chuck shafts 31 which are provided with screw threads, as indicated by reference numeral 32. The outer end portion of the chuck shafts passes through supporting brackets 33, which are welded to the spider arms. A head nut 34 is welded to the outer extremity of each chuck shaft. Slidably mounted in each spindle arm is a chuck jaw 35, having a base 36 and serrated face 37. A threaded bore is provided in the base of each chuck jaw to engage with the threads 32 on the chuck jaw shafts. A removable hand crank 38, having a socket which receives head nuts 34 is used to turn chuck shafts 31 and thus move chuck jaws 35 to any desired position. It is to be observed that by actuating any one of the chuck shafts the other chuck shafts and chuck jaws will be actuated in a like manner through the cooperation of bevel pinions 30 and bevel gear 27. A series of stud bolts 39 maintain cover plate 40 on a spider for preventing foreign material from entering the central opening of the spider. In addition to maintaining the cover plate in position the stud bolts join the spider and bevel gear 22 into a rigid structure.

Fixedly connected to one end of cross member 16 is an upwardly depending bracket 41 which is designed to receive and support a crank 42. Bevel pinion 43, which engages with bevel gear 22 is mounted at one end of crank 42 while a suitable handle 44 for actuating the bevel gear and pinion arrangement is provided at the other end. It is apparent that the above described assembly can be readily rotated on spindle 20 to any predetermined position.

My invention contemplates the utilization of means for tilting the table structure. In the illustrated embodiment I have shown a pair of substantially horizontal arms 45, welded to legs 14, and connected to a cross arm 46. A U-shaped member 47 is attached to cross arm 46 in upright position and contains a block 48 which is pivotally mounted therein. A partially threaded tilting shaft 49, which is adapted to engage with a threaded bore in block 48, is manually rotatable by crank handle 50. A pair of arms 51 is welded to cross member 16 and pivotally supports a block 52 near its lower ends. One end of shaft 49 is free to rotate in a bore 53 of block 52. Undesirable sliding movement of this shaft through block 52 is precluded by the use of collars 54 and set screws 55. Arms 56 extending from the base to arms 45 are used for the purpose of bracing the tilting means. The tilting structure herein described permits my device to be easily and quickly adjusted on an axis which is substantially at right angles to the axis of rotation of the chuck table 23.

In order to insure my device being set up in a level position for accurate work I have provided bubble levels 57. A conventional type of adjustable vernier 58 may be used for accurately positioning my device.

In the operation of the instant invention, a piece of work, such as a section of tubing not shown, is first placed on the device so that it rests upon spider 23. Removable hand crank 38 is then placed in engagement with one of the head nuts 34 and rotated, moving chuck jaws 35 along chuck shafts 31 until serrated faces 37 firmly grip the tubing. As I indicated above, with my arrangement of bevel gear 27, bevel pinions 30 and chuck shafts 31, the chuck jaws are all actuated in unison by merely turning one of the chuck shafts. This results in considerable time saving and also insures proper centering of the piece of work on my device.

The next step in the procedure is to tilt the spindle and the work which is clamped thereon to the desired predetermined angle. This is accomplished by operating crank handle 50 to rotate tilting shaft 49. Energy thus supplied causes the shaft to move through block 48. Arms 51 are therefore rotated in a clockwise or counter clockwise direction (Figure 3), depending on the direction of rotation of the tilting shaft. By virtue of their rigid connection to member 16, arms 51 will impart a rotating action to spindle 20 and the piece of work is tilted until it assumes the desired angular position.

The chuck table or spider 23 and the mechanism supported thereon may be readily rotated on spindle 20, as an axis, through the cooperation of crank 42, bevel pinion 43, and bevel gear 22. In the practice of my present invention the worker, for example, a welder, may perform his task from a single position. Oftentimes, the worker may, after properly positioning the piece of work on my device, perform the operations from a seated position.

It should be noted that my device is capable of being actuated by a source of motive power instead of manually as described.

It is to be understood that the form of my invention, herewith shown and described is to be taken as a preferred example of the same and that various changes in the shape, size and arrangement of parts may be resorted to without departing from the spirit of my invention as defined by the appended claims.

I claim:

1. In a chuck device, the combination comprising a stand, a spider having a plurality of tubular arms rotatably supported on said stand, a slot in each of said arms, a chuck jaw slidably mounted in each of said arms and extending through the corresponding slot for retaining work in fixed position with respect to said spider, and means for tilting said spider about an axis which is substantially at right angles to the axis of rotation.

2. In a chuck device, the combination comprising a stand, a spider having a plurality of tubular arms, a slot in each of said arms, a chuck jaw slidably mounted in each of said arms and extending through the corresponding slot for retaining work in fixed position with respect to said spider, a spindle connected to said stand and supporting said spider, means for rotating said spider about said spindle as an axis, and means for tilting said spider about an axis which is substantially at right angles to the axis of rotation.

3. In a chuck device, the combination comprising a stand, a spider having a plurality of tubular arms, a slot in each of said arms, a chuck jaw slidably mounted in each of said arms and extending through the corresponding slot for retaining work in fixed position with respect to said spider, a spindle connected to said stand and supporting said spider, gear means for rotating said spider about said spindle as an axis, and means for tilting said spider about an axis which is substantially at right angles to the axis of rotation.

4. In a chuck device, the combination comprising a stand, a spider having a plurality of tubular arms rotatably supported on said stand, a slot in each of said arms, a chuck jaw slidably mounted in each of said arms and extending through the corresponding slot for retaining work in fixed position with respect to said spider, means for adjusting the relative position of said chuck jaws, and means for tilting said spider about an axis which is substantially at right angles to the axis of rotation.

5. In a chuck device, the combination comprising a stand, a spider having a plurality of tubular arms, a slot in each of said arms, a chuck jaw slidably mounted in each of said arms and extending through the corresponding slot for retaining work in fixed position with respect to said spider, gear means for adjusting the relative position of said chuck jaws, a spindle connected to said stand and supporting said spider, gear means for rotating said spider about said spindle as an axis, and means connected to said stand and said spider for tilting said spider about an axis which is substantially at right angles to the axis of rotation.

BRUNO A. JACOBS.